(12) United States Patent  
Matsuoka (10) Patent No.: US 9,229,486 B2
(45) Date of Patent: Jan. 5, 2016

(54) PORTABLE COMPUTER HOUSING AND ASSEMBLY METHODS

(71) Applicant: Google Inc., Mountain View, CA (US)

(72) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 13/792,862

(22) Filed: Mar. 11, 2013

(65) Prior Publication Data

US 2014/0254078 A1  Sep. 11, 2014

(51) Int. Cl.
*H05K 5/00* (2006.01)
*H05K 7/00* (2006.01)
*G06F 1/16* (2006.01)

(52) U.S. Cl.
CPC ............ *G06F 1/1675* (2013.01); *G06F 1/1656* (2013.01); *G06F 1/1662* (2013.01); *Y10T 29/49002* (2015.01)

(58) Field of Classification Search
CPC .............................. G06F 1/1616; H01H 13/70
USPC ............. 361/679.01–679.07, 679.26–679.29, 361/679.4–679.45, 679.57–679.59, 361/726–727, 732, 740–747, 759; 248/298.1, 274.1, 122.1; 312/223.1, 312/223.2, 223.3
See application file for complete search history.

(56) References Cited

U.S. PATENT DOCUMENTS

| 5,335,141 A | 8/1994 | Hosoi |
| 5,510,953 A | 4/1996 | Merkel |
| 5,546,334 A | 8/1996 | Hsieh et al. |
| 5,966,284 A | 10/1999 | Youn et al. |
| 5,987,704 A | 11/1999 | Tang |
| 6,212,066 B1 | 4/2001 | Fetterman |
| 2002/0085337 A1 | 7/2002 | Rubenson et al. |
| 2002/0085338 A1 | 7/2002 | Lin |
| 2014/0355193 A1* | 12/2014 | Purcocks ................. 361/679.17 |

FOREIGN PATENT DOCUMENTS

EP  0404155 A2  12/1990

OTHER PUBLICATIONS

International Search Report and Written Opinion for Application No. PCT/US2014/022508 dated Jun. 25, 2014.
U.S. Appl. No. 61/672,041, filed Jul. 16, 2012.
U.S. Appl. No. 61/680,824, filed Aug. 8, 2012.

* cited by examiner

*Primary Examiner* — Jerry Wu
(74) *Attorney, Agent, or Firm* — Lerner, David, Littenberg, Krumholz & Mentlik, LLP (57) ABSTRACT

A portable computer includes a first housing having a first wall defining a first opening and a surface surrounding the opening and having an inside periphery. A first component is removably received within the opening and defines a body with an outer periphery that is inset with respect to the inner periphery of the opening. A first locking member is removably attached within the opening. The first locking member defines an outer periphery extending along the inner periphery of the first opening of the housing. The first locking member also defines a second opening having an inner periphery that is inset with respect to the outer periphery of the first component body such that a portion of the first locking member overlies a first portion of the first component body. A second portion of the first component is exposed within the opening of the first locking member.

26 Claims, 7 Drawing Sheets

PORTABLE COMPUTER HOUSING AND ASSEMBLY METHODS

BACKGROUND

Housings for portable notebook or clamshell-style computers are often made from a number of plastic panels or sections that are assembled onto a metal frame. The metal frame is structured to retain and attach together the computer's internal components. Such internal components can include a printed circuit board that carries the computer's central processor and any additional processors such as for graphics or the like as well as the computer's random-access memory (RAM). Additional components include batteries, input devices such as a keyboard and trackpad or the like, storage memory (such as a hard drive, solid-state drive, or the like, communications devices (such as for WiFi connection and networking), removable memory devices (such as CD- or DVD-R/W drives), and structures for external peripheral connections.

In such frame-based housing structures, all components can be affixed to the frame, which itself can be made up of several different parts. The components of the housing are in turn attached to the frame to provide a somewhat uniform external appearance and to provide protection for the internal components. In a notebook (or clamshell) configuration, the arrangement just described can make up a base unit that is configured to rest on a surface. Another assembly in the form of a lid, or display, housing can be attached to the base housing by a hinge. The lid housing can include a video display, which can be in the form of a LCD panel with various forms of backlighting associated therewith. Similar to the base housing, the display (and any other components also included within the lid housing) can be affixed to another frame to which other housing sections or panels are affixed to enclose the lid assembly. The hinge can be attached to both the frame of the lid and the frame of the base with portions thereof extending through openings between or within the housing sections or panels.

The hinged attachment between the base and lid housings can allow the computer to be moved between open and closed configurations. The closed configuration being such that the lid is positioned against the base with the display and input devices positioned internally of the housing units for protection thereof during transportation. In the open configuration, the display is viewable and the input devices are accessible to the user. The lid can be rotated through a range of positions to provide for comfortable viewing of the display.

Such housing configurations can be complicated to assemble and to disassemble for repair or maintenance reasons due to the complicated nature of attaching multiple housing components to the frame. Further, they can be bulky due to the number of components and the complex assembly patterns required. Further, the number of joints or connections between components can provide a number of potential failure areas that can reduce the overall strength and protection provided by such housings. Additionally, because of the various ways in which the multiple panels are assembled together, repair or replacement of one component, such as the keyboard for example, can require removal of a number of panes, some of which may also be attached to the lid, requiring removal thereof or removal of other additional components or sub-assemblies. These configurations can also be visually unappealing, due to the number of separate components used and due to the gaps therebetween, which can expose fasteners, tabs or the like. This can be particularly noticeable, for example, around the keyboards used in such computer assemblies.

Other structures have been developed that seek to combine the utility of the frame into a part of the housing units and to reduce the overall number of exterior pieces that make up the housing. Such structures can be made from metal and can, for example include in one unit the top wall of a base housing (that surrounds the keyboard) along with the front and side walls thereof. This unit can also have internal reinforcement and can include attachment structures (such as threaded holes) for attachment of the internal components). A separate unit can define the bottom wall of the base and can attach to the upper housing unit. Such structures can provide for easier assembly of components, initially, but can be even more difficult to repair. For example, to replace the keyboard of such a computer, the entire base housing must be disassembled and, in some instances the main circuit board may have to be removed. Further, because the keyboard must be assembled early on in the assembly process of such computers, customization of the keyboard or custom-selection among various keyboards by a purchaser can be difficult or can require long lead times, as the computer assembly cannot begin until an order is taken.

BRIEF SUMMARY

An aspect of the present disclosure relates to an portable computer including a first housing having a first wall defining a first opening and a surface surrounding the opening. The opening has an inside periphery. A first component is removably received within the opening. The first component defines a body with an outer periphery that is inset with respect to the inner periphery of the opening. The device further includes a first locking member removably attached within the opening. The first locking member defines an outer periphery extending along the inner periphery of the first opening of the housing. The first locking member also defines a second opening having an inner periphery that is inset with respect to the outer periphery of the first component body such that a portion of the first locking member overlies a first portion of the first component body. A second portion of the first component is exposed within the opening of the first locking member and within the opening of the first wall of the first housing.

DETAILED DESCRIPTION

Figure 1:
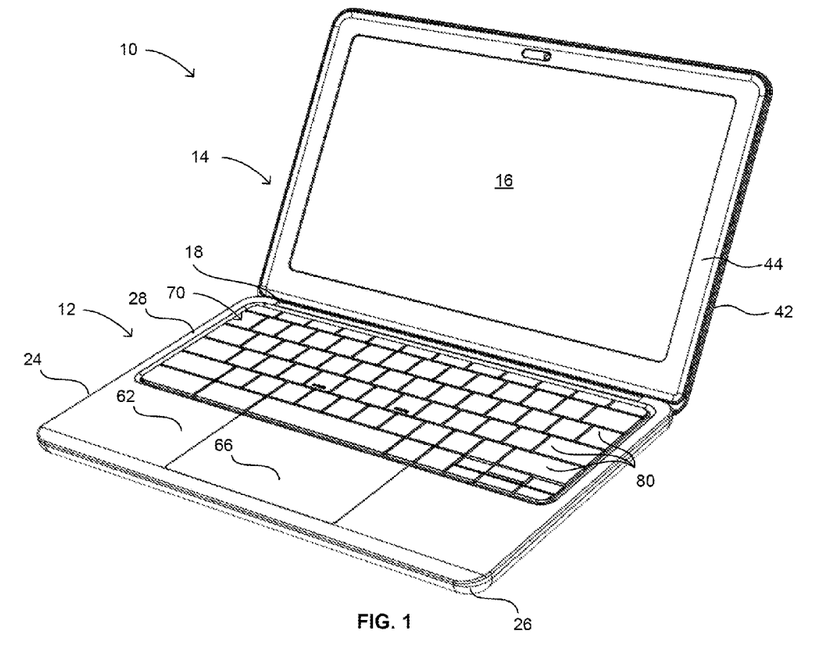
FIG. 1 shows a portable computer according to an embodiment of the present disclosure.
Figure 2:
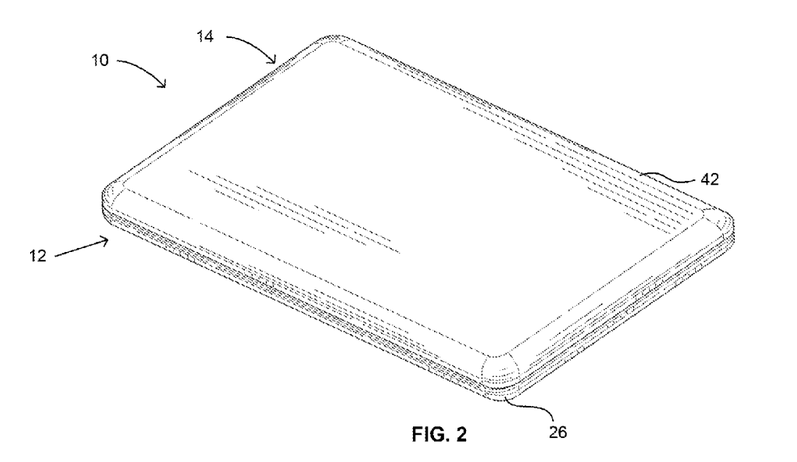
FIG. 2 shows the portable computer of FIG. 1 in a closed configuration.

Turning to the drawings, FIGS. 1 and 2 show a portable computer 10 in the form of a "notebook" or "clamshell"

computer with a base 12 configured to rest on a surface and to support a lid 14 including a screen 16. Lid 14 is connected to base 12 by a hinge 18 that allows the lid 14 to close against the base 12, as shown in FIG. 2, and to be opened by rotation away therefrom into a user-selectable viewing position during use of the computer 10, an example of which is shown in FIG. 1.

Base 12 includes a keyboard 70 and a trackpad 66 for user input to computer 10. The trackpad 66 can also be referred to as a touchpad and can include any type of touch-sensitive input, operating by capacitive, magnetic, resistive, surface-acoustic wave or other forms of touch-sensitivity. Both the keyboard 70 and trackpad 66 are mounted to base so that they are exposed at (or otherwise available for user interaction on) an outside surface of the upper wall 28 of the base 12. It is noted that the terms "upper", "lower", and other terms related to relative positions of elements are done with respect to the frame of reference depicted in FIG. 1. Such terms are used for convenience and do not limit the actual positions of the elements should the device be repositioned.

Base 12 includes an upper housing 24 that consists of a unitary material structure that includes the upper wall 26. Base further includes a lower housing 26 that is assembled with the upper housing to enclose many of the internal components of the computer 10. As with upper housing 24, lower housing 26 can be primarily of a unitary material structure. In some examples, lower housing 26 may include additional outer components, such as covers for externally-accessible batteries or the like. In one example, upper housing 24 can be made from a single piece of plastic or metal, as can lower housing 26, with any walls, including upper wall 28, being integrally formed with the adjacent walls without any joining in the form of fastening, gluing, welding, or metallic joining such as soldering, braising or the like. Plastic materials can include polycarbonate (PC), ABS, PCABS, or the like. Metal materials can include aluminum, aluminum alloy, magnesium alloys, stainless steel, or the like. Such housings 24 and 26 can be made by injection molding metal or plastic, by die-casting metal.

Figure 3:
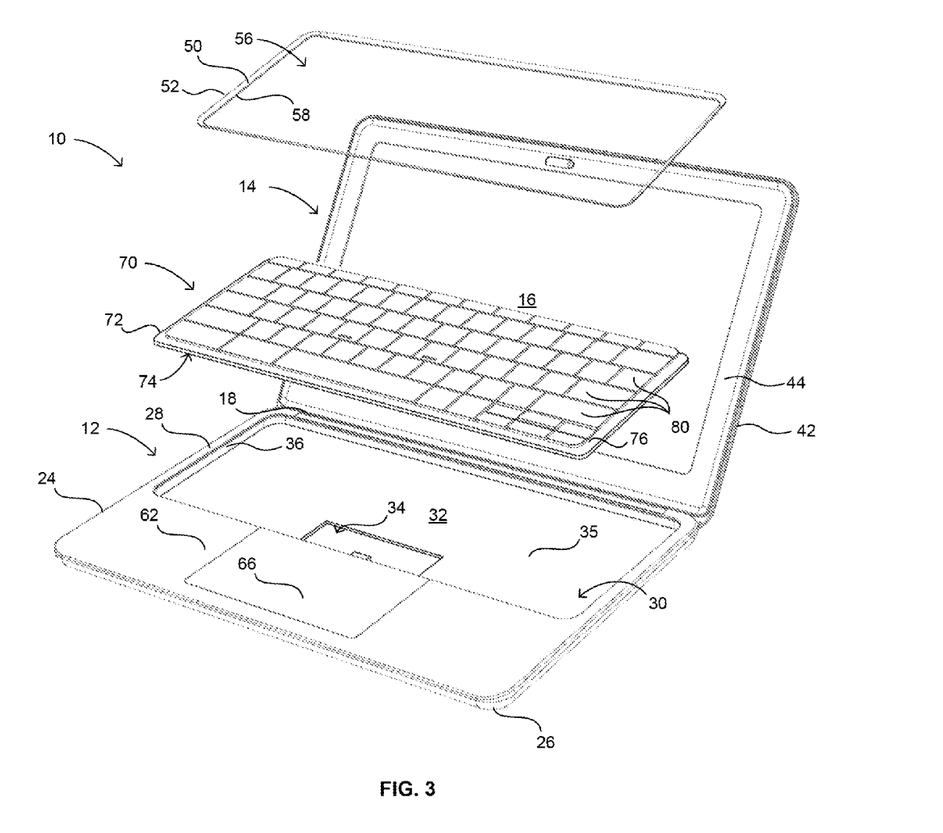
FIG. 3 shows an exploded view of components of the computer of FIG. 1.

As shown in FIG. 3, upper housing 24 also includes a keyboard opening 30 and a trackpad opening 40 that generally follow the facial profiles of the respective keyboard 70 and trackpad 66 such that they can be assembled therein and accessed by a user. An upper wall 28 of housing 24 can define a palmrest area 62 adjacent keyboard 70 and trackpad 66. A number of peripheral connection openings (not shown) to the interior of the base assembly 12 can also be included in housings 24 and 26, and can allow for access to peripheral connections for computer 10 such as for a power adapter plug, a USB device, one or more memory cards, audio devices, or the like.

Lower housing 26 is configured to enclose internal components of base 12 when assembled with upper housing 24. Lower housing 26 can also be configured to allow computer 10 to rest on a surface when in use. As such, lower housing 26 can include a generally flat lower surface with a plurality of feet or grip members (not shown) that allow base 12 to rest on a surface and to be resistant to sliding during normal use. Lower housing 26 can be configured to attach with upper housing 24 using screws or other fasteners to enclose internal components such as one or more batteries, and CPU board assembly and related circuitry, communications structures, connection components, such as USB plugs, or power plugs, as well as internal portions of trackpad assembly 66 and keyboard assembly 70. Upper housing 24 and lower housing 26 can be configured such that selected ones of the aforementioned components can attach with either upper housing 24 or lower housing 26 prior to attachment of the two housings together.

As shown in FIGS. 1 and 2, lid 14 can include an outer housing 44. Lid 14 also includes a bezel 44 that is attached to outer housing 44. Together, outer housing 44 and bezel 44 can receive and enclose additional components of computer 10 therein. Such components can include a display assembly including screen 16. Bezel 44 can be configured to surround at least part of the display screen 16 associated with lid 14. Further, bezel 44 can help retain the display assembly that is configured to be positioned within lid 14. As such, bezel 44 can contact the display assembly 60 on a side thereof opposite upper housing 44. Bezel 44 also defines a display opening 58 through which at least the screen portion 16 of the display assembly is viewable by a user. The distance by which bezel 44 extends inward can vary depending on the configuration of, for example, the display assembly itself and/or the materials from which lid housing 44 is constructed. Outer housing 44 and bezel 44 can be assembled together using glue, pressure-sensitive adhesive, or mechanical fasteners such as screws, snap-fit elements or the like. In another example, the outer housing 44 of lid 14, as well as upper housing 24 and lower housing 26 of base 12 can be integrally formed with bezel 44 as a unitary housing configured with multiple, solidly joined, walls of a single piece of material, as described in co-pending, commonly-owned U.S. Provisional Patent App. Nos. 61/672,041 and 61/680,824, the entire disclosures of which are hereby incorporated by reference.

As shown in FIG. 1, hinge 18 can connect base 12 with lid 14. Hinge 18 can be configured to allow lid 14 to rotate with respect to base 12 to provide the desired range of rotation therebetween to allow lid 14 to be positionable in the closed position and through a usable range of open positions, as discussed above. Hinge 18 can also be configured to provide internal friction to maintain a selected open position of lid 14 relative to base 12. As can be seen in FIGS. 1 and 2, the particular structure of hinge 18 shown is configured such that the axis of rotation between lid 14 and base 12 is positioned within base 12. Other configurations are possible in other examples, such as those wherein the axis of rotation is positioned within lid 14 or outside of both lid 14 and base 12. Various other hinge structures and configurations can be incorporated in computer 10, other than that which is shown in FIGS. 1 and 2.

As shown in the exploded view of FIG. 3, computer 10 can be configured so that keyboard assembly 70 can be externally assembled with base 12 independent of the assembly of internal computer components or the assembly of upper housing 24 with lower housing 26. In the example shown in FIG. 3, computer 10 can be configured so that substantially all of computer 10 (excluding keyboard assembly 70) can be assembled together before assembling keyboard 70 with base 12. In the example shown, this assembly is facilitated by the structure of computer 10, including the incorporation of a keyboard opening 30 positioned in the upper surface 28 of upper base housing 24. In the example shown, keyboard opening 30 is open to a recess 32 defined by upper base housing 24 that includes a lower surface 35 that is generally parallel to and positioned below upper surface 28. A wall 36 extends between upper surface 28 and lower surface 35 and defines an outer periphery of recess 32 that extends from the periphery defined by opening 30.

As also shown in FIG. 3, keyboard assembly 70 can include a body in the form of a substrate 70 that defines parallel and spaced-apart upper 76 and lower 74 surfaces. Substrate 70 further has affixed thereto over upper surface 76 a plurality of keys 80 configured to provide various inputs to computer 10 common of computer keyboards in general. The keys 80 can be in any number of keyboard configurations and arrangements provided, for example, for different languages, countries or regions, etc. These arrangements can include the characters printed on or otherwise identified by the keys 80 and the relative locations thereof, for example. As shown, substrate 72 defines its own outer periphery 78 that extends beyond the outermost ones of the keys 80 supported by substrate 72.

Figure 4:
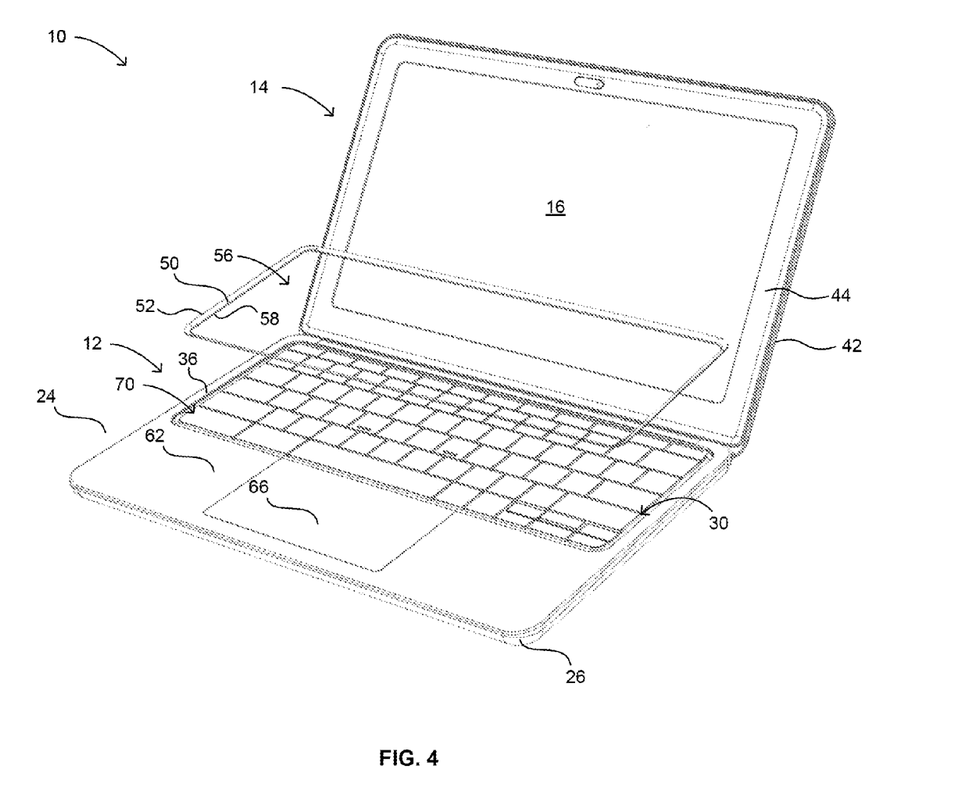
FIG. 4 shows another exploded view of components of the computer of FIG. 1.

The wall 36 of recess 32 and the periphery 78 of substrate 72 can be configured such that substrate 72 can be received within recess 32 with lower surface 74 of substrate 72 resting on lower surface 35 of recess 32, as shown in FIG. 4. The particular fit between substrate 72 and recess 32 can vary, but in the present example can be such that keyboard assembly 70 can be moved into recess 32 without significant resistance but such that lateral movement of keyboard assembly 70 within recess 32 is limited. The relative sizes of substrate 72 and recess 32 can be adjusted to account for tolerances in the various manufacturing processes used in formation thereof. Other configurations of substrate 72 and recess 32 are possible, including those in which a press or resistance fit is achieved between substrate 72 and recess 32 or those in which a certain degree of lateral movement of keyboard assembly 70 within recess 32 is permitted with other features, such as adhesives or other fasteners used to maintain the lateral position of keyboard assembly 70 within recess 32. Further, the depth D of recess 32 relative to the overall height H of keyboard assembly 70 can be such that keys 80 are substantially even with upper surface 28 of housing 24 or project slightly above surface 28 (e.g., by up to 2 mm+/−5%).

In an example, recess 32 can include an access opening 34 within recess 32 to allow keyboard assembly 70 to be connected with components internal to base 12, such as the motherboard or the like. Although such features are omitted from the figures for clarity, the general structure of such features can be similar to those used in other portable computer applications. In an example, a connection cable (not shown) can extend from keyboard assembly 70 and can be extended through access opening 34 to connect with an a corresponding connection internal to base 12. In another example, a cable can extend from an internal component within base 12 that is configured to receive inputs from keyboard assembly 70 and can pass through access opening 34 to be connected with keyboard assembly 70 prior to keyboard assembly 70 being placed within recess 32.

Other configurations of portions of upper housing 24 within opening 32 are possible. In one example, upper housing 24 can be substantially open to the interior of base 12 within opening 30 with a plurality of appropriately-positioned tabs or other support structures extending inward relative to opening 30 to retain keyboard assembly 70 in an appropriate position relative to opening 30 and upper surface 28. In another example, recess 32 can include a plurality of openings similar to access opening 34 to provide additional pass-throughs for connection between keyboard assembly 70 and internal components of base 12 or to allow for cooling, weight reduction, or transmission of sound from internal speakers. In such a configuration, the plurality of openings can be sized and positioned such that a web-like support structure that is substantially open to the interior of base 12 defines recess 32.

As further shown in FIGS. 3 and 4, computer 10 can include a locking member 50. Locking member 50 can have a continuous frame-like structure defining an outer surface 52 and an interior opening 56. Locking member can be configured such that the outer surface 52 fits securely within wall 36 and/or opening 30 and further such that a portion thereof extends past the outer periphery 78 of substrate 72 and contacts a portion of upper surface 76 of substrate 72. Accordingly, locking member 50 can be assembled with base 12 after the keyboard assembly 70 has been positioned within recess 32 to secure keyboard 70 to base 12. Locking member 50 can be made of a polymeric material such as a plastic or the like, including ABS, PC, or the like. Other materials can also be used for locking member such as various rubbers, including TPE or the like, nylon, various metals, and others. Locking member 50 can be configured to be somewhat flexible or compressible so that it can make an appropriately tight fit within opening 30 and so that it can exert a force against substrate 72 to maintain contact between lower surface 74 of substrate 72 and lower surface 35 of recess 32.

Figure 5:
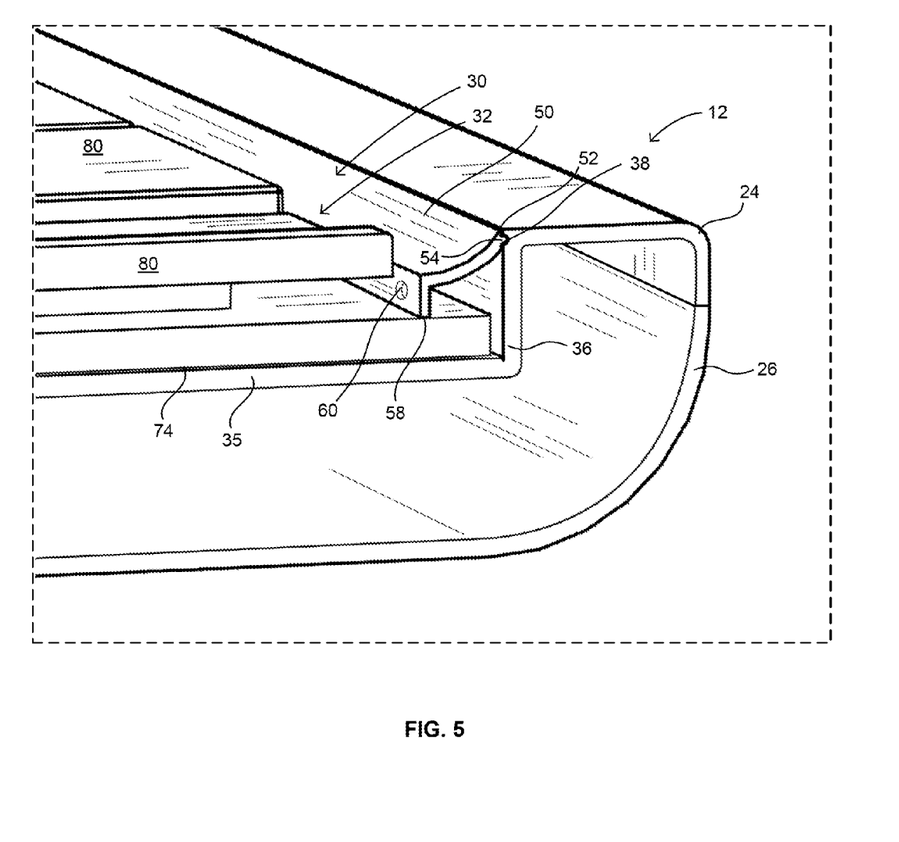
FIG. 5 shows a cross-sectional detail view of the computer of FIG. 1.

As shown in the cross-sectional view of FIG. 5, locking member 50 can include a protrusion 54 that extends outward from the outside surface 52 thereof to engage with a corresponding channel 38 in wall 36 to provide a snap-fit between locking member 50 and recess 32. The protrusion 54 and channel 38 can extend around the entire peripheries of wall 36 and of outside surface 52 or, in another example, locking member 50 can include a number of separate protrusions 54 positioned at various locations therearound that can match with a plurality of corresponding channels 38 in wall 36. In yet another, example, wall 36 can include one or more protrusions and locking member 50 can include corresponding channels. Still further features can be used to achieve a snap-fit assembly between locking member 50 and recess 32.

FIG. 5 further illustrates the relationship between keyboard assembly 70, recess 32, and locking member 50 (with internal components of base 12 omitted). Specifically, FIG. 5 illustrates shows locking member 50 assembled within recess 32 in contact with wall 36 and extending inwardly therefrom to overlap with substrate 72 of keyboard assembly 70 and to contact upper surface 76 thereof. As such, the opening 56 defined by locking member 50 can be smaller than keyboard opening 30 and also smaller that the area defined by substrate 72, but large enough to provide adequate access to and clearance for keys 80. As previously mentioned, locking member 50 can be of a resiliently-flexible material such as Nylon, plastic, or the like. The use of a flexible material can allow locking member 50 to be oversized with respect to the depth with which it extends into recess 32 such that it flexes somewhat when pressed into contact with surface 76. This can cause locking member 50 to exert a constant downward force onto substrate 70 that can help to retain the position, both vertically, and laterally, of keyboard assembly 70 within recess 32. Other shapes and configurations of locking member 50 can be used and can be adjusted or otherwise devised to give varying cosmetic appearances, to provide varying fits or interactions with recess 32 and keyboard assembly and to take advantage of various material properties.

As further shown in FIG. 5, locking member 50 can include an aperture 60 or another similar feature therein to provide a location at which a tool or other instrument can engage or attach with locking member 50 to remove it from recess 32. This can allow keyboard assembly 70 to be removed from recess 32 for repair or replacement, as will be described in greater detail below. A plurality of such features can be incorporated in locking member 50 and can be positioned to be visually imperceptible to a casual user of computer 10. Alternative structures for aperture 60 can include slots, undercuts, or points of separation between locking member 50 and surface 76.

Returning to FIG. 3, an example of computer 10 is shown wherein trackpad assembly 66 is positioned with respect to upper housing 24 of base such that a touch-sensitive surface 68 thereof extends through a portion of wall 36 of recess 32 such that an edge of the surface 68 defines a portion of keyboard opening 30. Other arrangements for trackpad assembly 66 are possible including those in which a portion of upper housing 24 can extend between surface 28 and recess 32 such that surface 28 defines the entirety of opening 30. In the configuration illustrated, and as shown in FIG. 1, a portion of locking member 50 can extend between surface 68 and keyboard assembly 70 to provide visual separation therebetween. Trackpad assembly 66 can be assembled with base 12 such as by attachment thereof to upper housing 24 before assembly with lower housing 26 by screws or other mechanical fasteners. In other examples, trackpad assembly 66 can be assembled with base 12 after assembly of upper housing 24 with lower housing 26 to enclose internal components of base 12 and further after assembly of base 12 with lid 14. In an example of such an assembly, upper housing 24 can be configured such that trackpad assembly 66 can be slid into a corresponding opening 40 by being first positioned within recess 32.

Figure 6:
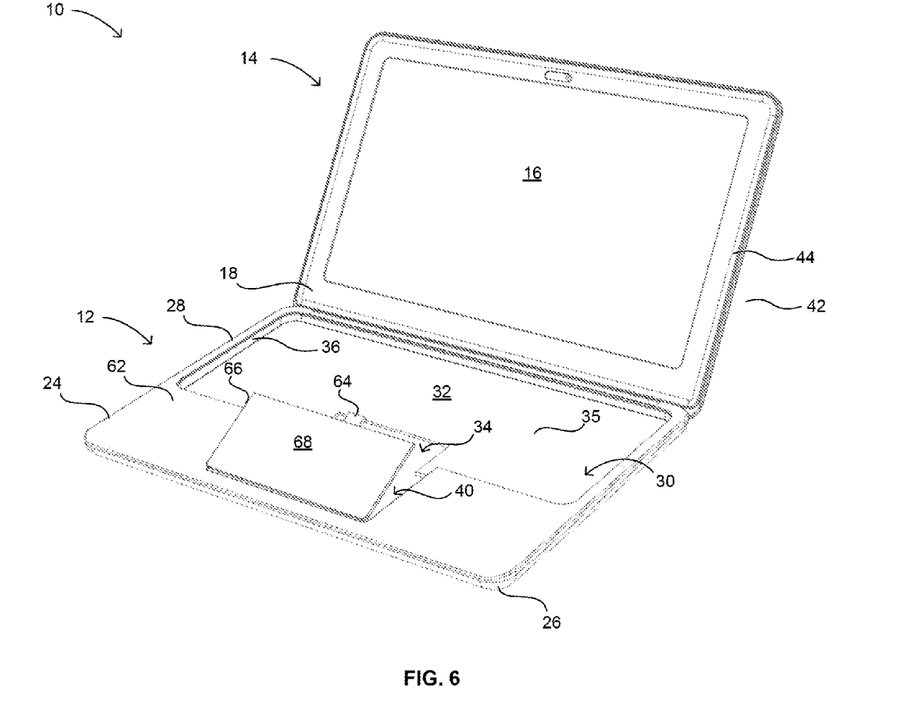
FIG. 6 shows a partially-assembled view of a possible configuration of the computer of FIG. 1.

In another example shown in FIG. 6, trackpad assembly 66 can be configured to engage with housing 24 at an end of opening 40 opposite recess 32, such as by providing interengaging features within housing 24 or the like. Trackpad assembly 66 can then be rotated into a position such that surface 68 is substantially parallel with surface 28. Both trackpad assembly 66 and housing 24 or internal features of base 12 can be configured such that trackpad assembly 66 is appropriately seated and supported in such a position. When such positioning is achieved, keyboard assembly 70 can be inserted into recess 32, as described above. Trackpad assembly 66 can be configured with a tab 64 that is positioned to extend underneath substrate 72 when keyboard assembly 70 is in place or alternatively, under a portion of locking member 50 when in place within opening 30. In another variation, trackpad assembly 66 can be assembled within opening 40 as just described, but tab 64 can be attached with upper housing 24 for example, by a mechanical fastener such as a screw or the like, that is the visually obscured by locking member 50 when in place within opening 30.

Trackpad assembly 66 can include various sub-components commonly associated with trackpads or other touch-sensitive input devices. This can include a touch sensitive substrate 68 that includes the actual surface that the user interacts with. The trackpad assembly 66 can also include a support structure (not shown) that can retain substrate 68 and can include associated circuitry or other functionality, such as structures to provide a clickable trackpad surface or the like. In an alternative structure to that described above, such a support structure can be configured to extend outwardly around substrate 68 such that substrate 68 can fit within opening 40 with the support structure contacting the portion of upper wall 26 that surrounds opening 42. This assembly can be secured with adhesives or mechanical fasteners and can be done prior to the attachment of lower housing 26 to upper housing 24.

Figure 7:
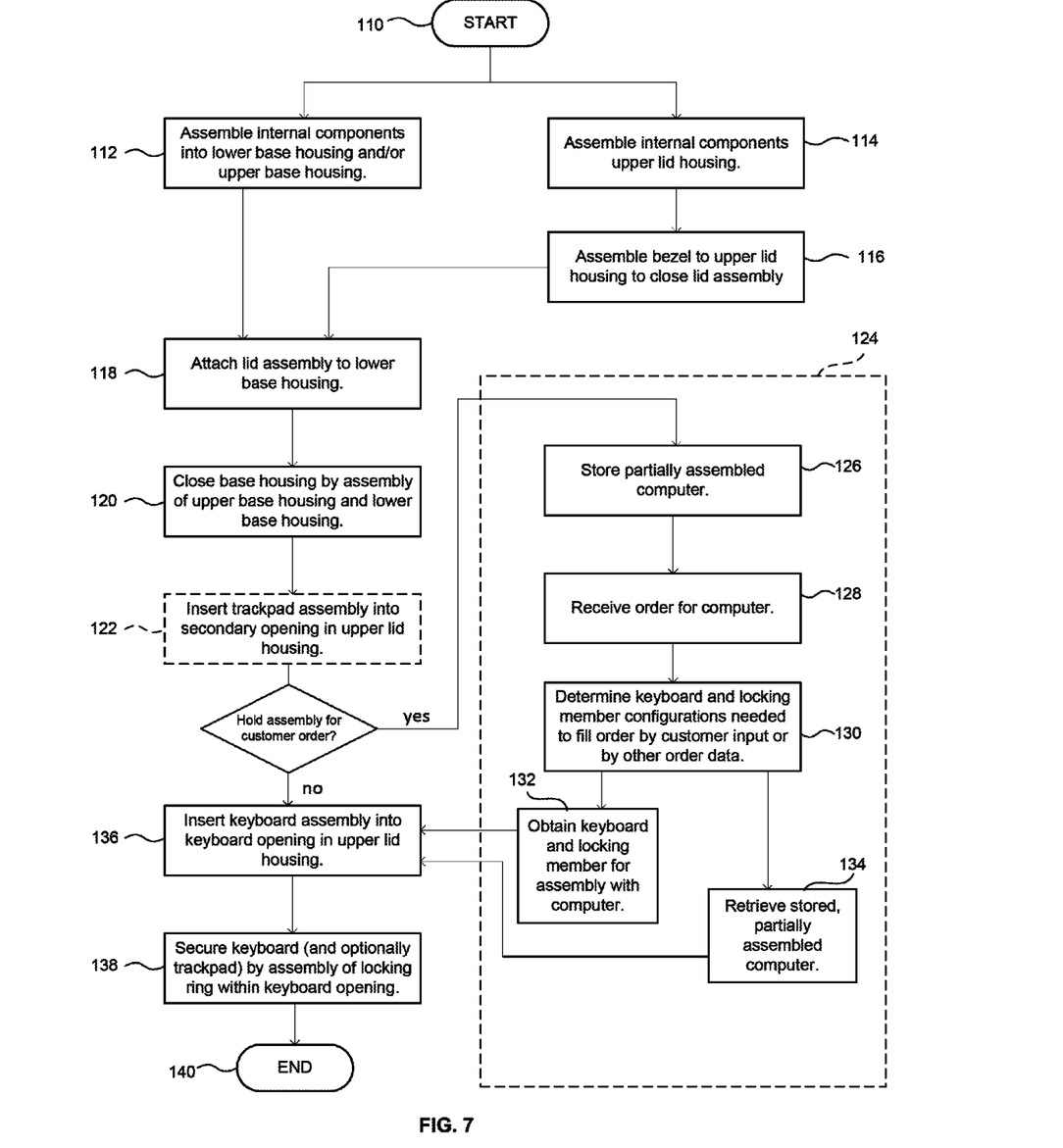
FIG. 7 is a flowchart of a method for assembling a portable computer according to an aspect of the present disclosure.

FIG. 7 shows a flowchart illustrating steps in a method for assembling a computer such as computer 10 having a keyboard 72 securable to the base 12 thereof by a locking member 50 or the like. Upon starting the method (step 110), the internal components can be assembled with either or both of the upper housing 24 or the lower housing 26 of the base (step 112). Similarly, internal components for lid 12, such as display 16 and related circuitry or the like, can be assembled with lid housing 42 (or in some configurations with bezel 44) in step 114. The lid 14 can then be assembled by attaching bezel 44 with lid housing 44 in step 116. In one example of computer assembly, the lid 14 can then be attached at hinge 18 or a portion thereof to lower housing 26 in step 118. In other computer configurations, lid 14 can be attached to base 12 after assembly of both of these components are separately assembled, or after assembly of base 12 but before assembly of lid 14. The order of these steps can vary depending on the configuration of computer 10 and of hinge 18 or the like and the method herein can be adjusted or altered accordingly. In the present example, upper housing 24 can be attached with lower housing 26 in step 120 and after the completion of step 118. At this point, the computer 10 can be fully enclosed with all internal components secured within either base 12 or lid 14. Further, as discussed above, trackpad assembly 66 can be assembled with lid 12 in step 112 or can be assembled as an externally-attached component in optional step 122. This can be done, for example, using a trackpad 66 as shown in FIG. 6 or another similar structure.

In an optional subset of method steps 124, the enclosed computer assembly achieved by steps 110 through 120 (and optionally 122) can be stored in an incomplete state without a keyboard 70 or locking member 50 assembled therewith (step 126). This can allow for a number of computers 10 to be stored while awaiting orders, either directly from customers, such as through an internet-based ordering system or the like, or by retailers. Separately from such partial computer assemblies, a number of differently-configured keyboard assemblies 70 can be stored, as can a number of differently-configured locking members 50. As mentioned above, the different keyboard assemblies can include keyboards of different region or language based key configurations. They can also include keyboards with various other features, such as lighted and non-lighted keyboards, or standard or waterproof (or spillproof) keyboards, or keyboards of different colors or styles. In connection with an direct or retail-based ordering system, these different keyboard configurations can be customer options, allowing a user to select from a number of different keyboard configurations, styles or options at the point of purchase. In another implementation, a region or language based keyboard can be automatically selected by the system based on the user's region (determined, for example from the IP address of the computer from which the order was made or by the shipping address). In either selection method, information regarding a selected keyboard can be stored in connection with the user's order. Similarly, different locking members 50 can be stored separately from the keyboards 70 and computer assemblies. For example, locking members 50 can be provided in various colors that can be selectable by a customer or retailer when ordering a computer. Additionally, locking members of various particular shapes can be provided as can locking members 50 having various additional options, such as built-in lighting or the like can be provided at the option of the customer or retailer.

In such an example, an order for a complete computer 10 is received, including information regarding a selected keyboard configuration and/or locking member configuration (step 128). Subsequently the data can be read, by an automated system or by a person, to determine the keyboard 70 and locking member 50 needed to complete the computer 10 as-ordered (step 130). The appropriate keyboard 70 and locking member 10 can then be obtained (step 132) along with a partially-assembled computer 134.

Subsequently, whether or not a keyboard or locking member customization sub-method 124 is implemented, the keyboard 70 can then be placed within keyboard opening 30 in step 136. The keyboard 70 can then be secured to base 12 by assembly of locking member 50, as discussed above with respect to FIG. 5, within opening 30 over a portion of keyboard assembly 70 (step 138) to complete the method (step 140).

Figure 8:
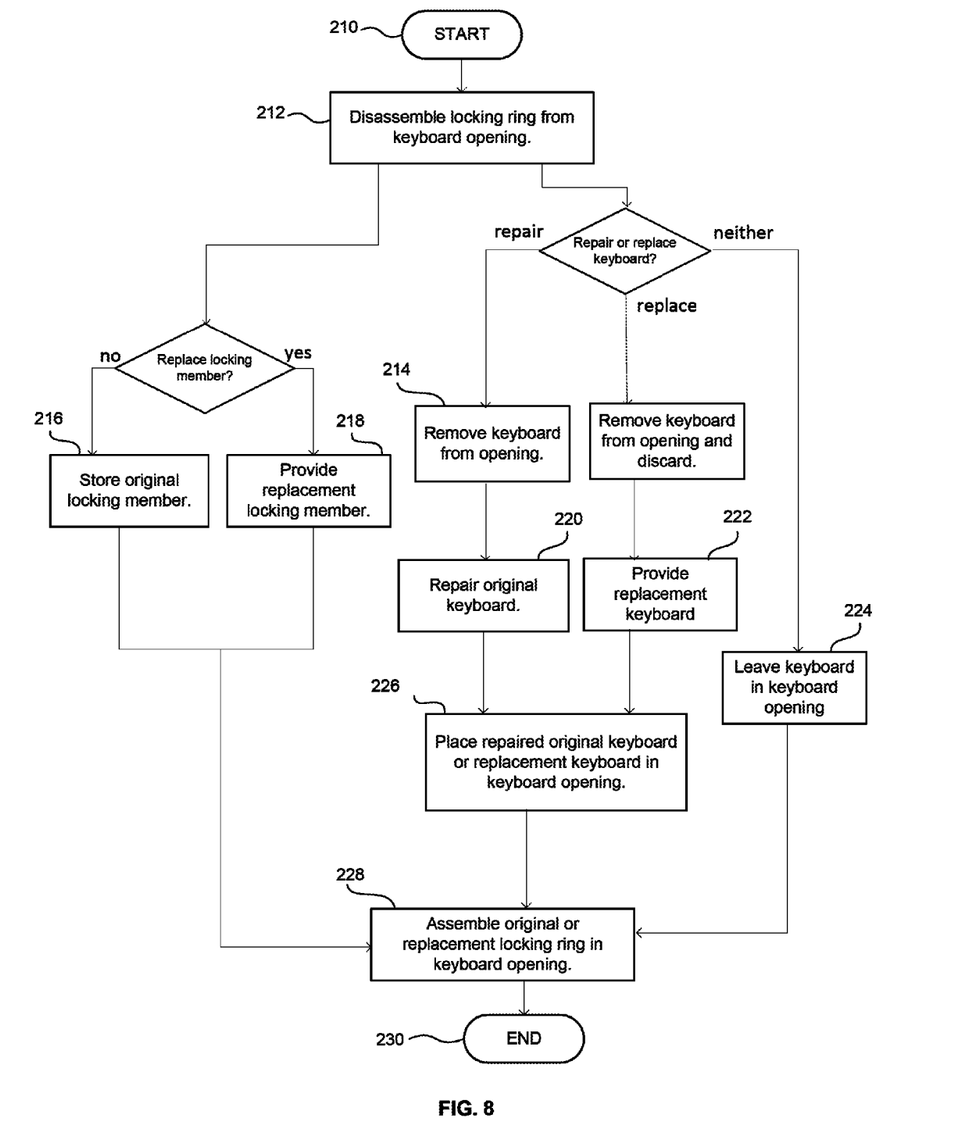
FIG. 8 shows a flowchart of a method for repairing or replacing various components of a portable computer according to another aspect of the present disclosure.

Another method according to another aspect of the present disclosure is illustrated in the flowchart of FIG. 8. Such a method can be carried out using, for example, the computer 10 described above with respect to FIGS. 1-6, and can allow for repair or replacement of the keyboard 70 and/or locking member 50 without additional disassembly of base 12 or removal of internal components therefrom. Such a method can be used to repair or replace a keyboard 70 and/or locking member 50 in cases of damage to one of these components or to allow for upgrades to or customization of such components. Upon starting the method (step 210), the locking member 50 can be removed from base 12 (step 212) such as by pulling locking member 50 from out of opening 30 (which can be done using a tool inserted within an aperture 60 in locking member 50, for example). At this point, the original locking member 50 can be set aside (step 216) or a replacement locking member 50 can be obtained (step 218). If only the locking member 50 is to be replaced, then the keyboard 70 can be left in opening 30 (step 224) and the new locking member can be re assembled within opening 30 and the method can be ended (step 230).

In other instances, wherein the keyboard is to be repaired or replaced, the keyboard 70 can be removed from opening 30 (step 214) by lifting keyboard vertically therefrom. In some cases it may be necessary to disconnect any cables used to achieve electrical communication between keyboard 70 and internal components of base 12. The keyboard can then optionally be repaired (step 220) or a replacement keyboard can be obtained (step 222). The repaired original or replacement keyboard 70 can then be connected with internal components of base 12 and can be repositioned within opening (step 226). The original locking member 50 or a replacement locking member 50 can then be assembled within opening 30 over a portion of keyboard assembly 70 to secure keyboard assembly to base 12 to complete the method (step 230).

Such a method can be used, for example, to replace a locking member 50 of one color with another locking member 50 of a different color. Additionally or alternatively, the method can be used to replace a keyboard assembly 70 with another one having keys 80, for example, of a different color, or to upgrade a standard keyboard 70 to one having incorporated illumination or waterproofing, as discussed above. Further, the method can be used to replace a keyboard 70 of one regional or language based key 80 configuration with a keyboard 70 of another region or language based configuration.

Other repair, upgrade, and/or reconfiguration of keyboard 70 and locking member 50 are possible using the above-described method or variations thereof. Similarly, the methods described with respect to the flowcharts in both FIG. 7 and FIG. 8 can be used with variations of the computer 10 shown in FIGS. 1-6 that incorporate any type of externally-assembled keyboard assembly secured in place with any type of a locking member.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A portable computing device, comprising: a first housing including a first wall defining a first opening and a surface surrounding the opening, the opening having a first mechanism associated therewith and an inside periphery;
   a first component removably received within the opening, the first component defining a body with an outer periphery that is inset with respect to the inner periphery of the opening; and
   a first locking member removably engaged with the first mechanism within the opening, the first locking member defining an outer periphery extending along the inner periphery of the first opening of the housing, the first locking member further defining a second opening having an inner periphery that is inset with respect to the outer periphery of the first component body such that a portion of the first locking member overlies a first portion of the first component body, a second portion of the first component body being exposed within the opening of the first locking member and within the opening of the first wall of the first housing wherein when the first locking member is engaged with the first mechanism, the first locking member and the first mechanism form a snap-fit connection adjacent a top edge of the inside periphery of the opening to secure the first component within the opening.

2. The device of claim 1, wherein the first portion of the body of the first component is positioned between the first locking member and a portion of the first housing within the opening.

3. The device of claim 2, wherein the first housing defines a recess having a floor, the first opening being an opening to the recess, and the portion of the first housing within the opening including the floor of the cavity.

4. The device of claim 1, further including a second component within the housing, wherein the first portion of the body of the first component is positioned between the first locking member and a portion of the second component.

5. The device of claim 1, wherein the first housing is a base housing for a notebook computer, wherein the first component is a computer keyboard having a plurality of keys mounted to the body within the second portion thereof.

6. The device of claim 5, wherein the first wall of the first housing extends laterally outward from the keyboard to define a palmrest area adjacent the keyboard.

7. The device of claim 5, further including a lid housing having a display viewable thereon and being rotatably affixed to the base housing between an open position wherein the display is viewable by a user and a closed position wherein the display is positioned parallel to and adjacent the first surface of the base housing.

8. The device of claim 1, wherein the periphery of the first component is defined around four sides thereof, and wherein the first opening of the first housing is continuously surrounds at least three of the sides and a portion of a fourth one of the sides.

9. The device of claim 8, wherein the periphery of the first opening is defined by a single piece of material that continuously defines the first wall of the housing.

10. The device of claim 1, wherein the locking member is of a continuous piece of material that continuously surrounds the second portion of the keyboard body.

11. The device of claim 10, wherein the first wall of the first housing further includes a second opening that is at least partially connected with the first opening, and wherein the locking member extends between the first and second openings.

12. The device of claim 11, wherein a second electronic component is received within the second opening and is at least partially retained within the first housing by the locking member.

13. The device of claim 1, wherein the second portion of the keyboard body defines a plurality of attachment tabs around which the outer periphery of the keyboard body is defined.

14. The device of claim 1, wherein the first component is unattached with the first housing upon removal of the locking member from the first housing.

15. A method for assembling a portable computing device, comprising: positioning a first component within a first opening in a wall of a first housing, the opening having an inside periphery with the wall extending laterally outward from the periphery, and the first component defining a body with an outer periphery that is inset with respect to the inner periphery of the opening; and securing the first component body within the first opening by affixing a locking member within the first opening, the locking member defining an outer periphery and a second opening having an inner periphery that is inset with respect to the outer periphery, the locking member being removably affixed within the first opening such that the outer periphery thereof extends along the inner periphery of the first opening of the housing and such that a portion of the locking member overlies a first portion of the first component body, a second portion of the first component body being exposed within the opening of the first locking member and within the opening of the first wall of the first housing wherein affixing the locking member within the first opening comprises forming a snap-fit connection between the locking member and the opening by engaging the locking member with a mechanism associated with a top edge of the inside periphery of the opening such that it can be removed and re-connected via the snap-fit connection.

16. The method of claim 15, wherein the step of removably affixing the locking member within the first opening includes applying pressure to the locking member to engage a press-fit structure between the locking member and the first opening.

17. The method of claim 15, wherein the locking member is of a continuous piece of material that continuously surrounds the second opening, and wherein the step of removably affixing a locking member within the first opening includes positioning the locking member within the first opening such that the outer periphery thereof is aligned with the inner periphery of the first opening.

18. The method of claim 15, wherein the first component is unaffixed with the first housing before the step of removably affixing the locking member within the first opening.

19. The method of claim 15, wherein the device includes a plurality of internal components that are assembled within the first housing before the steps of positioning the first component within the first opening and removably affixing the locking member within the first opening.

20. The method of claim 15, wherein the first housing is a base housing for a device, the first housing having a first portion that includes the first wall and a second portion, the first portion and the second portion being assembled together to enclose a plurality of internal components therein before the steps of positioning the first component within the first opening and removably affixing the locking member within the first opening.

21. The method of claim 20, wherein the first component is a computer keyboard having a plurality of keys mounted to the body within the second portion thereof.

22. The method of claim 21, further including selecting the computer keyboard from a plurality of computer keyboards according to first criteria after assembly of the first housing portion with the second housing portion.

23. The method of claim 20, wherein the device further includes a lid housing having a display viewable thereon and being rotatably affixed to the base housing between an open position wherein the display is viewable by a user and a closed position wherein the display is positioned parallel to and adjacent the first surface of the base housing before the steps of positioning the first component within the first opening and removably affixing the locking member within the first opening.

24. A method for replacing a keyboard in a device, comprising: removing a locking member from a releasably affixed snap-fit position within a keyboard opening of a lower housing unit of the device, the locking member being configured to surround an inner periphery of the keyboard opening and to overlie a portion of a first keyboard within the keyboard opening so that the keyboard is retained within the keyboard opening when the locking member is engaged with a mechanism positioned adjacent a top edge of the inner periphery of the opening; and removing the first keyboard from within the keyboard opening, the first keyboard defining a body with an outer periphery that is inset with respect to the inner periphery of the opening such that the first keyboard is moveable from out of the keyboard opening after removal of the locking member.

25. The method of claim 24, further including:
placing a second keyboard within the keyboard opening, the second keyboard defining a body with an outer periphery that is inset with respect to the inner periphery of the opening; and
returning the locking member to the releasably affixed position within the keyboard opening such that the locking member overlies a portion of the second keyboard within the keyboard opening to retain the second keyboard within the keyboard opening.

26. The method of claim 1, wherein the mechanism is a first mechanism and the locking member further comprises a second mechanism, wherein the first mechanism is comprised of one of a retaining channel and a protrusion and the second mechanism is another one.

* * * * *